Aug. 24, 1954  I. B. GARBER  2,686,988
FLORAL SHADOW BOX
Filed Feb. 6, 1951

INVENTOR.
Irving B. Garber
BY
Evans & McCoy

Patented Aug. 24, 1954

2,686,988

UNITED STATES PATENT OFFICE 2,686,988

FLORAL SHADOW BOX

Irving B. Garber, Cleveland Heights, Ohio, assignor to National Potteries, Cleveland, Ohio, a corporation of Ohio Application February 6, 1951, Serial No. 209,581

3 Claims. (Cl. 47—35)

This invention relates to floral shadow boxes for advantageously displaying cut flowers or flowering plants.

The shadow box of the present invention has top, bottom and side walls bordering a panel receiving opening and diverging outwardly from the opening. The box is adapted to be supported in an upright position and is constructed to provide a flower receptacle that extends across the opening and that is supported on the bottom wall of the box. A panel of the desired color or combination of colors is supported in the opening behind the box and provides a background for flowers or plants supported in the receptacle. The panels are readily removable and interchangeable and the receptacle is supported in a position such that the major portion thereof is disposed rearwardly of the outer edges of the side and bottom walls.

The box body may be formed of a suitable color to provide the desired contrast with the panel, and the side, bottom and top walls, together with the flower receptacle may be molded in one piece of a suitable plastic.

Referring to the accompanying drawings.

Figure 1:
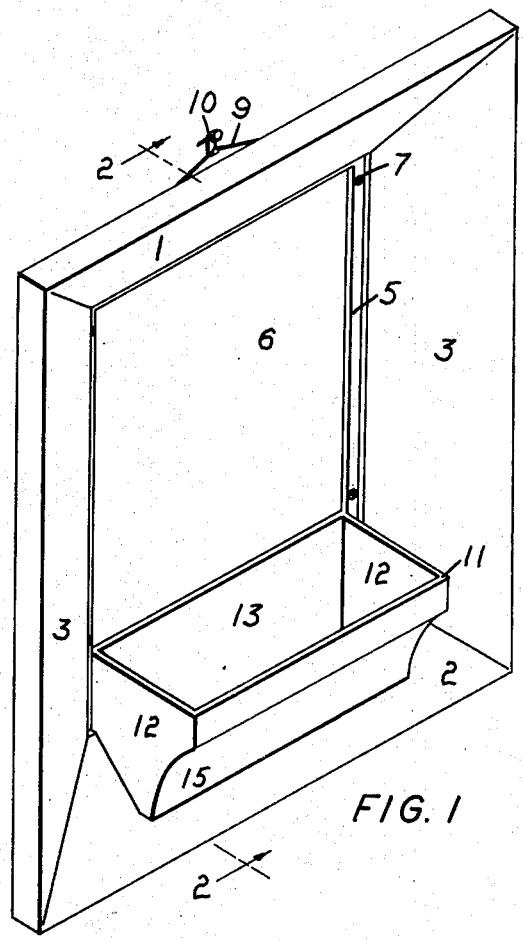
Figure 1 is a perspective view of a shadow box embodying the invention.
Figure 2:
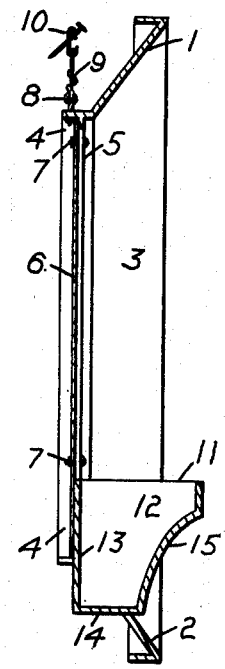
Fig. 2 is a vertical section taken on the line indicated at 2—2 in Fig. 1.

The floral shadow box of the present invention has top and bottom walls 1 and 2 and side walls 3 which surround a central panel receiving opening. The walls of the box are of identical cross sectional form and diverge outwardly from the panel opening to form a truncated pyramidoidal surface. The walls 1, 2 and 3 have inner edge portions 4 which are adapted to bear against a wall on which the box is supported and which have inwardly projecting stop ribs 5 that are spaced forwardly from the inner edges thereof. The inner faces of the ribs 5 lie in the same plane and the portions 4 inwardly of the ribs 5 are perpendicular to the plane of the ribs 5 to provide a recess to receive a detachable panel 6 which may be secured to the ribs 5 by any suitable means such as bolts 7.

The panel, which forms a background for the flowers in the receptacle 11, may be of any desired color or combination of colors, or may be a picture such as a landscape. If desired, the panel may be omitted and the wall on which the box is supported may provide the background. The walls 3 of the box may be of any color to provide a suitable contrast or harmonizing effect with the flowers and panel.

The shadow box may be supported on the wall in any desired manner. As shown in the drawing, eye bolts 8 may be secured to the inner edge portions 4 of the top wall. A wire 9 attached to these bolts may serve to support the box on a clip 10 attached to a wall.

An elongated flower receptacle 11 is supported on the bottom wall 2. The length of the receptacle 11 preferably corresponds to the width of the panel opening and has end walls 12 which are closely adjacent the inturned portions 4 of the side walls. The receptacle 11 is supported with its bottom above the outer edge of the bottom wall 2 and its top above the inner edge of the bottom wall 2, the receptacle having a vertical rear wall 13 which is preferably disposed with its inner face in the plane of the inner faces of the ribs 5.

The receptacle 11 has a bottom wall 14 and an upwardly and outwardly inclined front wall 15. The receptacle 11 may fit in a niche formed in the bottom wall 2 or it may be molded as an integral part of the box structure. The width of the receptacle 11 is such that the major portion of the receptacle is disposed inwardly of the outer edges of the side and bottom walls of the box. The receptacle 11 may serve as a suitable support for cut flowers or for flowering plants and the box walls and panel provide means for advantageously displaying flowers or plants supported by the receptacle 11.

It is to be understood that variations and modifications of the specific devices herein shown and described for purposes of illustration, may be made without departing from the spirit of the invention.

What I claim is:

1. A floral shadow box having a panel receiving opening bordered by top, bottom and side walls provided with inner wall engaging edges and with stop ribs having rear panel positioning faces in a plane forwardly of said inner edges, the portions of said walls inwardly of said ribs being substantially perpendicular to said plane to provide a panel receiving recess inwardly of said stop ribs, said walls diverging outwardly from said opening to form a truncated substantially pyramidoidal surface, and an elongated flower receptacle carried by the bottom wall outwardly of said panel receiving recess, said receptacle being of a length substantially corresponding to the width of the panel opening and positioned with its top above the inner edge of the bottom wall and its bottom above the outer edge of the bottom wall, the top edge of the rear wall of said receptacle forming the bottom of the panel receiving opening, the major portion of said receptacle being disposed inwardly of the outer edges of the bottom and side walls.

2. A floral shadow box having a panel receiving opening bordered by top, bottom and side walls provided with inner wall engaging edges and with stop ribs having rear panel positioning faces in a plane forwardly of said inner edges, the portions of said walls inwardly of said ribs being substantially perpendicular to said plane to provide a panel receiving recess inwardly of said stop ribs, said walls diverging outwardly from said opening to form a truncated substantially pyramidoidal surface, and an elongated flower receptacle carried by the bottom wall outwardly of said panel receiving recess, said receptacle being of a length substantially corresponding to the width of the panel opening and positioned with its top above the inner edge of the bottom wall and its bottom above the outer edge of the bottom wall, the rear face of the rear wall of said receptacle being disposed in the plane of the rear faces of said stop ribs, the major portion of said receptacle being disposed inwardly of the outer edges of the bottom and side walls.

3. A floral shadow box comprising top, bottom and side walls defining a rectangular picture frame surrounding a rectangular panel receiving opening, said walls being provided with inner wall engaging edges, a flat rectangular panel, means to support said panel in said opening, said walls diverging outwardly from said panel to form a truncated substantially pyramidoidal surface converging to and surrounding said panel, and front, rear and side walls defining an elongated flower receptacle of rectangular cross-section, said receptacle being of a length substantially corresponding to the width of said flat panel and having its rear wall adjacent to and parallel to said panel, the top of said receptacle being located above the inner edge of the bottom wall and adjacent the bottom wall of said panel and the bottom of said receptacle being positioned above the outer edge of the bottom wall with the major portion thereof being beneath said pyramidoidal surface, the front wall of said receptacle having an upper straight edge located a substantial distance above said pyramidoidal surface and away from said panel.

References Cited in the file of this patent

UNITED STATES PATENTS

| Number | Name | Date |
|---|---|---|
| D. 118,488 | Weil | Jan. 9, 1940 |
| D. 128,485 | Fuld | July 28, 1941 |
| 153,283 | Shatto | July 21, 1874 |
| 367,899 | Ecker | Aug. 9, 1887 |

FOREIGN PATENTS

| Number | Country | Date |
|---|---|---|
| 12,410 | Great Britain | June 18, 1901 |